United States Patent [19]

Heberlein et al.

[11] Patent Number: 4,495,625
[45] Date of Patent: Jan. 22, 1985

[54] MAGNETIC FIELD STABILIZED TRANSFERRED ARC FURNACE

[75] Inventors: Joachim V. R. Heberlein, Forest Hills; Maurice G. Fey, Plum Borough, both of Pa.

[73] Assignee: Westinghouse Electric Corp., Pittsburgh, Pa.

[21] Appl. No.: 510,785

[22] Filed: Jul. 5, 1983

[51] Int. Cl.³ .................... H05B 7/144; H05B 7/20
[52] U.S. Cl. .................................. 373/107; 373/108
[58] Field of Search .............. 373/107, 108, 104, 103, 373/102, 47

[56] References Cited

U.S. PATENT DOCUMENTS

| | | |
|---|---|---|
| 2,652,440 | 9/1953 | Simmons ............................. 373/107 |
| 3,309,550 | 3/1967 | Wolf et al. . |
| 3,385,987 | 5/1968 | Wolf et al. . |
| 3,505,460 | 4/1970 | Bruning . |
| 3,530,223 | 9/1970 | Akers . |
| 3,561,029 | 2/1971 | Bruning . |
| 3,654,513 | 4/1972 | Hammer . |
| 3,680,163 | 8/1972 | De Corso . |
| 3,683,094 | 8/1972 | Schlienger ......................... 373/107 |
| 3,689,740 | 9/1972 | De Corso et al. . |
| 3,777,112 | 12/1973 | Fey et al. . |
| 3,783,170 | 1/1974 | Kolano . |
| 3,793,468 | 2/1974 | Akers . |
| 4,110,546 | 8/1978 | Stenkvist . |
| 4,149,024 | 4/1979 | Stenkvist et al. ................... 373/107 |
| 4,154,972 | 5/1979 | Tylko . |
| 4,219,726 | 8/1980 | Meyer et al. . |

Primary Examiner—Roy N. Envall, Jr.
Attorney, Agent, or Firm—John Victor Pezdek

[57] ABSTRACT

A DC electric arc furnace utilizing a magnetic field stabilized electric arc. A DC magnetic field is employed to cause rotation and angular deflection of the electric arc about the surface of the melt. In one embodiment the DC magnetic field is induced by a field coil. In an alternate embodiment a specially shaped electrical insulating member can be positioned in the melt so that the flow of arc current through the melt creates a magnetic field which is used to cause arc rotation. In a further embodiment a plurality of coil sets are located about the periphery of the furnace are used in conjunction with current reversing and current sequencing means to create a rotating DC magnetic field which is used to rotate the arc. A ceramic electric insulator can also be supplied in the chamber of the furnace to prevent arc fixation in the region wherein the DC magnetic field is substantially parallel to the flow of arc current. Another embodiment utilizes a center insulator having an arm radially extending arm to the sidewall. Current flow through the melt to an electrode therein creates a magnetic field for precession of the arc. The arm prevents reversal of current flow in the melt to assure unidirectional arc precession. A split-ring electrode having an insulating ceramic insert can also be used in place of the center insulator and arm to produce precession.

31 Claims, 8 Drawing Figures

MAGNETIC FIELD STABILIZED TRANSFERRED ARC FURNACE

BACKGROUND OF THE INVENTION

1. Field of the Invention

This invention relates to a DC electric arc furnace for the heating and melting of materials.

2. Description of the Prior Art

In certain metallurgical applications it is advantageous to use a DC electric arc furnace in which the electric arc is transferred either to an electrode, typically the anode, located close to the material to be heated or melted or to the material itself. One application is where metallic oxides are used in these furnaces. In practice, carbon is added for their reduction and valuable metals are produced as a result of the electric arc reducing the melt, i.e., the material in the furnace to be melted. A stationary attachment of the arc to the reacting melt layer would produce strong temperature non-uniformities in the melt, and consequently, locally varying rates of reaction and possibly local failure of the refractory wall of the furnace. Non-uniformity of the product or product quality and possible disruption of the process may also be a consequence.

Various attempts have been made to prevent the stationary attachment of the arc to the material being heated. In U.S. Pat. No. 4,154,972, movement of the arc about the surface of the material to be melted was attempted by the precession of the arcing electrode. This furnace has the disadvantage that the arc motion is controlled at the arcing electrode whereas control of the motion of the arc at the arc attachment surface or the melt itself is desired. With this scheme, if the arc or the arc attachment at the melt is exposed to any disturbance the control of the arc motion is diminished. In U.S. Pat. No. 4,110,546, a rotating magnetic field generated by a variable frequency AC source is used to angularly deflect and rotate the arc within the furnace enclosure. There the melt forms the anode and the arcing electrode is the cathode in the DC circuit. By increasing the frequency of the AC supply to the coils, the speed of rotation of the arc is increased. A disadvantage with this arrangement is that both an expensive variable frequency AC power supply and a DC power supply must be provided to the furnace.

SUMMARY OF THE INVENTION

The present invention is a DC electric arc furnace utilizing a DC magnetic field to stabilize and precess the arc existing between the arcing electrode and the melt. The DC magnetic field is positioned such that the maximum interaction between the magnetic lines of flux thereof and the current flowing in the arc occurs at the point of arc attachment on the arc attachment surface or the melt. This point of arc attachment is termed the arc root. This interaction of the magnetic field and the arc current flowing through the arc root can produce rotation of the arc root due to the Lorentz force, the maximum force being generated when the magnetic field lines are in a direction perpendicular to the flow of arc current.

Various means are employed in the present invention to generate this DC magnetic field. In one embodiment of the invention, a field coil having multiple turns of wire is provided beneath the bottom of the furnace chamber. In a second embodiment of the invention, sets of field coils are disposed about the periphery of the furnace chamber. Each set is comprised of two coils connected in series and is connected to a current reversing means and a current switching means such that a rotating DC magnetic field may be created by these coil sets. A third embodiment of the invention utilizes the flow of current through the melt to generate the required magnetic field. There an electrical insulating member is provided in the melt to ensure that the current flow therethrough is in only one direction.

With the first two embodiments of the invention, an electrical insulating means can be provided at the point of minimum Lorentz force, i.e., where the magnetic field lines being substantially parallel to the flow of arc current. This insulating means is used to prevent arc fixation in this region due to the lack of available rotative force with which to move the arc. The insulating means may be further modified to include a core of highly magnetically permeable material. The purpose of the core is to strengthen and focus the magnetic field lines to cause the angular deflection of the arc from the longitudinal axis of the arcing electrode. The permeable core and the insulating means may be of any shape. However, the minimum radial dimension of the insulating means should correspond to a distance from the point of minimal Lorentz force, typically, about the vertical center line of the chamber, to a point on the plane formed by the arc attachment surface where the Lorentz force created by the interaction of the magnetic field and the current flowing at the arc root is sufficient to maintain the continual rotation of the arc root about a closed path on the arc attachment surface. Smaller radial dimensions for the electrical insulating means can result in arc fixation.

Positioning means may also be supplied for the field coils and for the arcing electrode. When employed, these means provide for variation in the arc path and the arc length, respectively. The DC power means which is used for the furnace may also be adjustable. In addition, the same power supply may be used for both the field coils and the arcing electrodes or they may each have their own separate DC power supply. Further modifications of the present invention include the use of feed means for delivering material to charge the furnace and melt collection means for the removal of the heated or melted material from the furnace chamber.

BRIEF DESCRIPTION OF THE DRAWINGS

For a better understanding of the invention reference may be made to the preferred embodiments exemplary of the invention shown in the accompanying drawings wherein.

DESCRIPTION OF THE PREFERRED EMBODIMENTS

Figure 1:
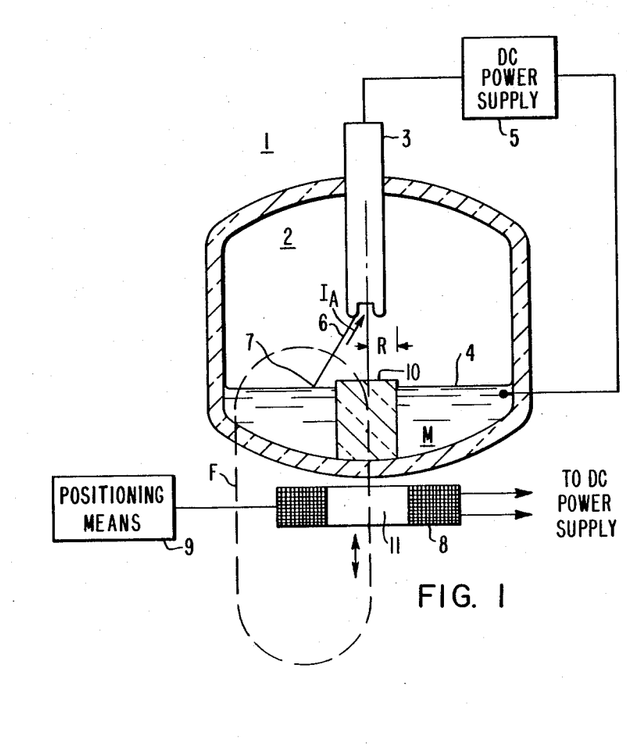
FIG. 1 shows a section of a DC electric arc furnace embodying the present invention.

The DC electric arc furnaces embodying the present invention utilize a DC magnetic field to cause the precession of the electric arc inside the furnace chamber. The DC magnetic field is positioned so that it controls the motion of the arc at the arc attachment surface and not at the tip of the arcing electrode. Referring now to FIG. 1, a DC electric arc furnace 1 is shown having a chamber 2 in which the material to be heated or melted M, known as melt, is contained. Disposed with the chamber 2 is an arcing electrode 3, the arcing electrode 3 being in communication with the interior of the chamber 2. An arc attachment surface 4 is provided in the interior of the chamber 2. This arc attachment surface 4 can be formed by either the melt M or an electrode. If an electrode is provided for this purpose, typically, an annular graphite or an annular internally water-cooled copper electrode is used with this electrode being positioned in or proximate the melt M. As shown schematically in FIG. 1, a DC power supply 5 is electrically connected to the arcing electrode 3 and the arc attachment surface 4. The DC power supply 5 is used to establish a potential between the arcing electrode 3 and the arc attachment surface 4 and for providing current for flowing in an electrical arc 6. The electric arc 6 is established between the arcing electrode 3 and the arc attachment surface 4 by conventional arc starting means (not shown) such as a fusible link or by decreasing the gap between the tip of the arcing electrode 3 and the arc attachment surface 4.

The electric arc 6 allows current to flow through the arcing electrode 3 and the arc attachment surface 4. The point of electric arc attachment upon the arc attachment surface 4 is termed the arc root 7. The current flowing in the electric arc 6 is designated $I_A$. The direction of current flow is dependent upon the connection of the arcing electrode 3 and the arc attachment surface 4 to the DC power supply 5. Preferably, the arcing electrode 3 is the cathode and the arc attachment surface 4 is the anode. When the furnace 1 is in operation, the electric arc 6 heats or melts the melt M at the arc root 7.

The electrode 3 may be either a conventional graphite electrode or a non-consumable electrode as disclosed in U.S. Pat. Nos. 3,530,223; 3,561,029; and 3,680,163, each of these patents being assigned to the present assignee of the instant invention. These non-consumable electrodes are water-cooled and utilize an electrode tip coil to rotate the arc over the tip of the electrode to prevent tip erosion due to localized overheating caused by the electric arc. When the arcing electrode is connected as the cathode preferably the tip of the electrode is made of a thermionically emitting material such as tungsten.

A field coil 8 is disposed with the chamber 2 such that a magnetic field F induced by the flow of DC current through the field coil 8 interacts with the electric arc 6 at the arc root 7 to cause the precession of the electric arc 6 over the arc attachment surface 4. Various configurations for the field coil are possible. Typically, the field coil is an annular ring having an outer diameter generally corresponding to the outside dimensions of the chamber 2.

Figure 2:
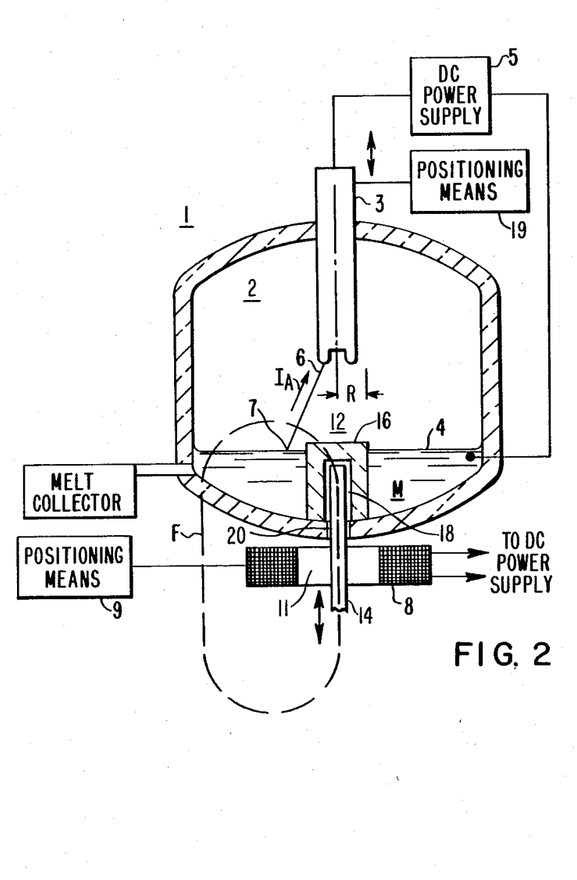
FIG. 2 shows a cross section of an alternate embodiment of the present invention utilizing an electrical insulating means in the melt having a highly magnetically permeable core.

Preferably, the arcing electrode 3 is mounted on the top of the chamber 2 and has its longitudinal axis substantially parallel to the vertical center line of the chamber 2. Also the arc attachment surface 4 is positioned in the interior of the chamber 2 proximate the bottom thereof and is substantially perpendicular to the vertical center line of the chamber 2. This arrangement of the arcing electrode 3 and arc attachment surface 4 is shown in FIGS. 1 and 2. With this arrangement, the field coil 8 is located beneath the chamber 2 and is also substantially perpendicular to the vertical center line of the chamber 2. As shown in FIGS. 1 and 2, the field coil 8 may be provided with conventional positioning means 9 to allow the axial positioning of the field coil 8 with respect to the bottom of the chamber 2 as indicated by the double headed arrow. This arrangement allows the point of interaction between the induced magnetic field F of the field coil 8 and the electric arc 6 to be axially adjusted within the furnace, this point of interaction being dependent upon the level of the melt M contained within the chamber 2.

In FIG. 1, an electrical insulating member 10 is provided within the chamber 2 proximate the arc attachment surface 4. The electrical insulating member 10 is located in the region where the magnetic field F from the field coil 8 is substantially parallel in direction to the current IA flowing in the electric arc 6. The electrical insulating member 10 is used to prevent the formation of the electric arc 6 between the arcing electrode 3 and the arc attachment surface 4 in the central region of the melt M; thereby, avoiding arc fixation in this region of minimal rotative force. Another effect of the electrical insulating member 10 upon the electric arc 6 is that the electric arc 6 is angularly deflected from a line which passes through the longitudinal center line of the arcing electrode 3 and which is also perpendicular to the arc attachment surface 4. This angular deflection of the electric arc 6 also helps to prevent arc fixation.

Preferably, the electrical insulating member 10 is positioned at the bottom of the interior of the chamber 2 along a line substantially parallel to the vertical center line of the chamber 2, with the electrical insulating member 10 also being in alignment with the longitudinal axis of the arcing electrode 3. The electrical insulating member 10 extends in a generally upward direction from the bottom of the chamber 2, a distance which is above the plane formed by the surface of the melt M or the arc attachment surface 4; whichever is greater. The minimum radial dimension R of the electrical insulating member 10 corresponds to a distance from the vertical center line of the chamber 2 to a point on the plane formed by the arc attachment surface 4 where the force created by the interaction of the applied magnetic field F and the current $I_A$ flowing at the arc root 7 is sufficient to maintain the continual rotation of the arc root about a closed path, usually circular, on the arc attachment surface 4. The electrical insulating member 10 is normally constructed of a ceramic material in order to withstand the high temperatures encountered within the chamber 2 of the electric arc furnace 1.

Shown in FIG. 2 is an alternate embodiment for the insulating member. There the electrical insulating member 12 is provided with a highly permeable magnetic core 14. In this arrangement, the electric insulating member 12 has an exterior insulating portion 16 in contact with the melted material and a passageway 18 therein for receiving the highly permeable core member 14. The core member 14 may extend through a passageway 20 provided in the bottom of the chamber 2. This external portion of the core member 14 can extend into the central opening 11 of the field coil 8 and is used to strengthen the magnetic field lines in a direction radially outward from the vertical center line of the chamber 2; thus, aiding in the angular deflection of the electric arc 6 from the vertical center line as well as in the precession of the arc root 7. Also, positioning means 19 for adjusting the distance between the melt M and the tip of the arcing electrode 3 can be provided.

Figure 3A:
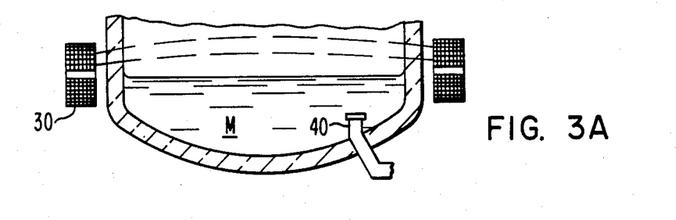
FIGS. 3A and 3B show an alternate embodiment of the invention utilizing a plurality of field coil sets.
Figure 3B:
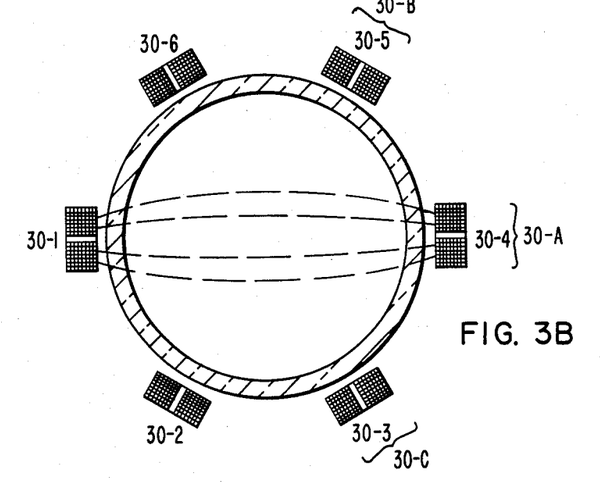
Figure 4:
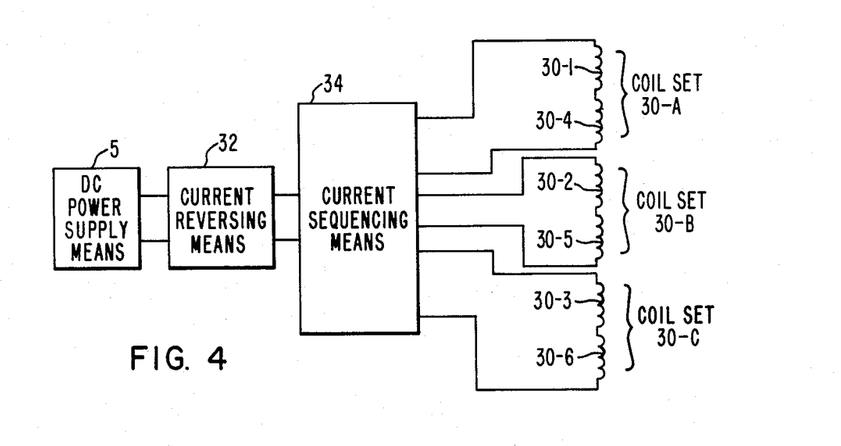
FIG. 4 shows a schematic representation of the electrical connections for the field coil sets shown in FIG. 3.

The magnetic field F which is used to rotate the arc root 7 may also be induced by the use of a plurality of coil sets 30 as shown in FIGS. 3A, 3B, and 4. Each coil set 30 has at least two coils electrically connected in series and being diametrically disposed opposite one another about the periphery of the chamber means 2. For example, where three coil sets are used, as shown in FIGS. 3B and 4, coil sets 30A, 30B and 30C are comprised of coils 30-1 and 30-4, 30-2 and 30-5, 30-3 and 30-6, respectively. These coil sets are electrically connected to a current reversing means 32 and a current sequencing means 34. In a continuing sequence, the DC current is applied to coil set 30-A through coils 30-1 and 30-4. These coils are then removed from the DC current source by the current sequencing means 34 and the current directed to coil set 30-B through coils 30-2 and 30-5. In turn, this coil set is removed from the DC source through the sequencing means 34 and the current applied to coil set 30-C through coils 30-3 and 30-6. At this point the direction of current flow through the coil sets is reversed via the current reversing means 32 and the current is applied to coil set 30-A through coils 30-4 and 30-1, respectively, the current is then removed from this coil set via the sequencing means 34 and sequentially connected to coil sets 30B and 30C in a similar manner. This continuing sequence creates a rotating DC magnetic field. The direction of current flow through the coil sets is reversed so that the direction of arc root rotation within the chamber is maintained in the same direction. The speed of rotation of the DC magnetic field is controlled by the speed of sequencing the coil sets. If the DC magnetic field is rotated too rapidly the arc will not follow the movement of the field. Therefore, the speed of rotation of the DC magnetic field is maintained such that the electric arc will follow it with a minimum of velocity modulation.

Again, positioning means (not shown) for these coil sets may also be provided. Here the coils may be adjustable axially and radially, so that the furnace may be able to accommodate various levels of melt M therein while being able to maximize the interaction of the magnetic field and the arc current. The electrical insulating member can also be provided. The sequencing means 34 can use electro-mechanical contactors or switches or solid-state electronic switches.

Figure 5:
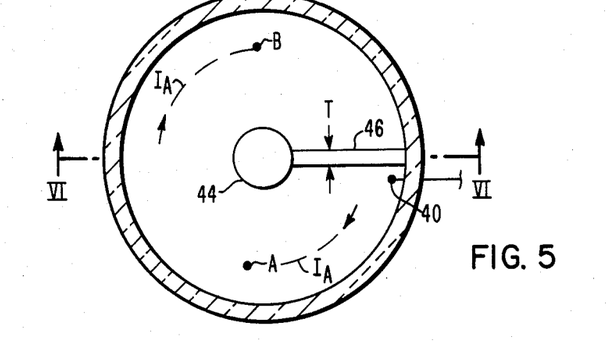
FIG. 5 is a sectional view of a further embodiment of the invention employing an electrical insulating means having a radially extended arm.
Figure 6:
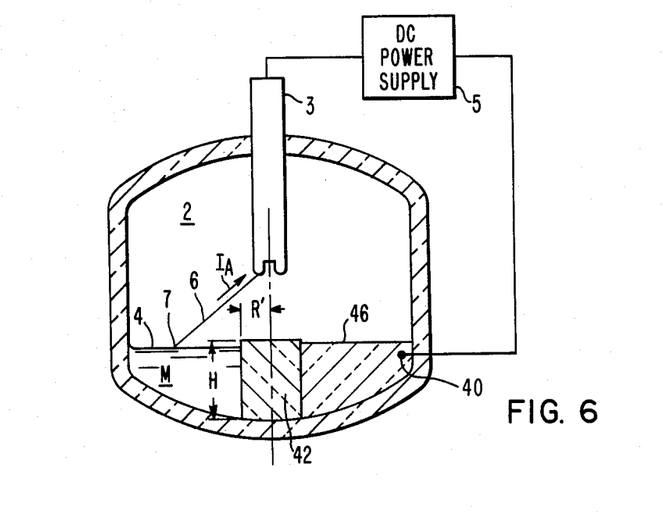
FIG. 6 is a sectional view of the apparatus of FIG. 5 taken along line VI—VI.

In FIGS. 5 and 6, another embodiment of the present invention is illustrated. There the arcing electrode 3 is disposed with the chamber 2 and is in communication with the interior portion thereof, the longitudinal axis of the arcing electrode 3 being positioned in a line substantially parallel to the vertical center line of the chamber 2. The arc attachment surface 4 is located proximate the bottom of the interior of the chamber 2 and is formed by the melt M. A connector 40 is disposed with the chamber 2 and is also in communication with the interior portion thereof. The connector 40 is in electrical connection with the melt M and is in a radially offset position from the vertical center line of the chamber 2. A DC power supply 5 is electrically connected to the arcing electrode 3 and the connector 40 creating a potential between the arcing electrode 3 and the arc attachment surface 4, i.e., the surface of the melt M, and provides current $I_A$ for flowing through an electric arc 6 formed therebetween. This current further flows through the melt M to the connector 40 inducing a magnetic field which interacts with the current flowing in the electric arc at the arc root 7. The direction of the magnetic flux of this induced magnetic field is substantially transverse to the direction of current flow at the arc root 7, thereby, creating a force which acts to rotate the electric arc root 7 about a closed path on the surface of the melt M.

An electrical insulating member 42 is also provided on the bottom of the chamber 2. This electrical insulating member 42 has a columnar portion 44 and a radially extending arm 46 with the height H of the insulating member being higher than the arc attachment surface 4 of the melt M. The columnar portion 44 is positioned along the line substantially parallel to the vertical center line of the chamber 2 and has a minimum radial dimension R' corresponding to a distance from the vertical center line to a point on the arc attachment surface 4 of the melt M where the force created by the interaction of the magnetic field induced by the flow of current through the melt M and the current in the electric arc 6 at the arc root 7 is sufficient to maintain the continual rotation of the arc root 7 about a closed path on the arc attachment surface 4 of melt M. The arm 46 extends between the columnar portion 44 and an interior wall of the chamber 2. The thickness T of the arm 46 is such that the flow of current cannot occur therethrough while also allowing the electric arc 6 to cross over or jump the arm 46 without being extinguished. This arm 46 is located adjacent the connector 40 so that the current flowing through the material will be in only one direction.

In FIG. 5, two points, A and B, are indicated to show various positions of the arc root 7 as it rotates about the arc attachment surface 4 of the melt M. Because current tends to flow in the path of least resistance and assuming essentially uniform resistivity of the melt M, it can be seen that the current flowing from the connector 40 through the melt to point B would be opposite in direction from the current flowing from the connector 40 through the melt M to point A. If the arm 46 were not present, the current would flow from the connector 40 directly to point B through the shortest path available causing a reversal in the current flow. This in turn reverses the direction of the DC magnetic field which is induced as a result of the current flowing through the melt M, thus, causing a reversal in the rotation of the arc root 7. With the insertion of the electrically insulating arm 46 between point B and the connector 40, current is usable to flow along this path. Because of the electrical insulating arm 40, the current at point B flows from the connector 40 in the same direction as the current flowing to point A thereby maintaining the rotation of the arc in the same direction. In this embodiment, rotation of the electric arc 6 at the arc root 7 on the arc attachment surface 7 of the melt M is obtained without the use of field coil. Again, the arcing electrode 3 may be of the types previously described hereinabove.

Figure 7:
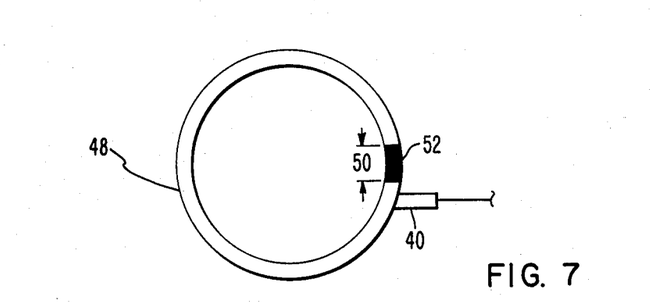
FIG. 7 is a further embodiment of the insulating means utilizing a split-ring electrode.

The insulating member having the radially extending arm as shown in FIGS. 5 and 6 can be replaced with the split ring electrode 48 shown in FIG. 7 without effecting the operation of the furnace. The split ring electrode 48 which forms the arc attachment surface has an annular shape having an outer diameter which is less than the interior dimension of the chamber and is constructed of an electrically conductive material having a resistivity which is less than that of the melt. A graphite or water-cooled copper electrode may be used. A gap 50 is provided between the ends of the split ring electrode 48 with the ends being adapted to receive and hold an electric insulator 52. The insulator 52, usually ceramic, preferably has the same cross-sectional shape as the split-ring electrode 48, and serves the same function as the radially extending arm 46. Accordingly, the electric insulator 52 is dimensioned such that the electric arc can jump or cross the insulator without being extinguished, yet prevents the flow of current to the connector 40 across the gap 50. The gap 50 and insulator 52 are positioned proximate connector 40 in order to maintain current flow in one direction about the split-ring electrode 48. Again the connector 40 is radially offset from the vertical center line of the chamber in order to make electrical connection with the split-ring electrode 48. The preferred location for this electrode is a short distance above the melt M in a plane substantially perpendicular to the vertical center line of the chamber. The current flowing through the split-ring electrode 48 to the connector 40 induces a DC magnetic flux field which causes the rotation of the arc root about the surface of the split-ring electrode 48.

Feed means and melt collection means (not shown) can also be provided with the various embodiments of the present invention. Both means are in communication with the interior of the chamber 2 for the charging and removal of material, respectively. Where the field coils are used, any shape may be used for these coils; with an annular shape being preferred. The distance between the coil means and the arc attachment surface is typically made as close as possible, however, this distance is adjustable. The field coils can be separate from the chamber or can be incorporated in the structure thereof. In addition, the DC power supply for the arcing electrode and arc attachment surface may be separate from the DC power supply used to energize the field coils. The DC power supply can also be made adjustable through conventional techniques. With all the embodiments of the present invention, the arcing electrode is normally connected as the cathode with the arc attachment surface being the anode; however, this may be reversed without affecting the operation of these furnaces.

It should also be understood that the furnaces of the present invention can be operated at atmospheric conditions. In addition, either a vacuum or a reducing atmosphere employing an inert gas such as argon or a hydrogen carbon monoxide mixture can also be used. For example, where only clean melting is desired, an argon atmosphere can be employed. Whereas, for the production of oxides, the hydrogen/CO mixture can be used.

The present invention as exemplified by the above embodiments has the advantage of controlling the rotation of the electric arc at the surface of the melt by use of only a DC power supply. This eliminates the need to provide the AC power supply or complex mechanical devices utilized in the prior art designs. A further advantage is that because the arc rotation is controlled at the melt surface irregularities of the melt do not diminish control of the arc movement thus avoiding problems including arc fixation, temperature nonuniformities, or refractory failure.

We claim:
1. An electric arc furnace, comprising:
chamber means for containing melt therein;
an arcing electrode disposed with the chamber means and in communication with the interior portion thereof;
an arc attachment surface in the interior portion of the chamber means, the arc attachment surface and the arcing electrode positioned such that an electric arc can be started and is maintained therebetween;
DC power means which in combination with the arcing electrode and arc attachment surface creates an electric potential therebetween and provides current for flowing through the electric arc;
field coil means disposed with the chamber means, the field coil means being electrically connected to the DC power means inducing a DC magnetic flux field thereabout, the field coil means being disposed in relation to the arc attachment surface such that the magnetic flux field is substantially transverse to the arc root on the arc attachment surface causing a force to be applied to the arc root resulting in the continual rotation of the arc root about a closed path on the arc attachment surface thereby allowing increased contact of the arc root with the melt; and
electrical insulating means proximate the arc attachment surface about a region wherein the magnetic flux field is substantially parallel to the current flowing in the electric arc, the electrical insulating means angularly displacing of the arc from the longitudinal axis of the arc electrode and preventing the formation of the electric arc between the arcing electrode and the arc attachment surface thereby avoiding arc fixation.

2. The furnace as described in claim 1 further comprising:
the arcing electrode being mounted on the top of the chamber means and having the longitudinal axis thereof being substantially parallel to the vertical center line of the chamber means; and
the arc attachment surface being positioned in the interior of the chamber means proximate the bottom thereof and substantially perpendicular to the vertical center line of the chamber means.

3. The furnace as described in claim 2, wherein the electrical insulating means is disposed at the bottom of the interior of the chamber means along a line substantially parallel to the vertical center line thereof, the electrical insulating means extending in a generally upward direction from the bottom a distance which is above the plane formed by the surface of the melt or the arc attachment surface, whichever is greater, the minimum radial dimension of the electrical insulating means corresponding to a distance from the center line to a point on the plane formed by the arc attachment surface where the force created by the interaction of the induced DC magnetic flux field and the current flowing at the arc root is sufficient to maintain the continual rotation of the arc root about the closed path.

4. The apparatus as described in claim 1 further comprising positioning means for the arcing electrode, the positioning means allowing the distance between the arcing electrode and the arc attachment surface to be increased or decreased.

5. The apparatus as described in claim 1 further comprising a field coil positioning means allowing the field coil means to be moved in an axial and/or radial direction with respect to the arc attachment surface to permit modification of shape of the DC magnetic field interacting with the arc thereby varying the closed path of the arc root within the chamber means.

6. The apparatus as described in claim 1 further comprising:
a water-cooled nonconsumable arcing electrode; and
electrode arc rotating means for rotating the arc over the tip portion of the water-cooled nonconsumable arcing electrode thereby preventing tip erosion due to localized overheating.

7. The apparatus as described in claim 6 wherein the tip arcing electrode is made of tungsten.

8. The apparatus as described in claim 1 further comprising electrically connecting the arc attachment surface and the arc electrode as the anode and cathode, respectively, and the arc attachment surface being the melt.

9. The apparatus as described in claim 1 wherein:
the bottom has a passageway therethrough located about the center line of the chamber means; and
the electrical insulating member has an exterior insulating portion in contact with the melt and an interior core having high magnetic permeability, the axial dimension of the core being greater than that of the insulating member and extending through the bottom passageway to the exterior of the chamber means whereby the insulating member prevents arc fixation and the core enhances the strength of the induced DC magnetic flux field interacting with arcing current to increase the force available to rotate the arc root in a closed path about the arc attachment surface.

10. The apparatus as described in claim 1 further comprising the arc attachment surface being an annular ring, the ring having a diameter less than that of interior opening of the chamber means so that the path of the electric arc substantially follows the ring.

11. The apparatus as described in claim 10 wherein the ring is formed of graphite.

12. The apparatus as described in claim 10 further comprising the ring being formed of an electrically conductive nonmagnetic material and having a passageway therein which extends about the length thereof, the passageway being used to conduct cooling water through the ring to prevent the overheating of the ring.

13. The arc furnace described in claim 1 wherein the field coil means further comprises:
a plurality of coil sets, each set having at least two coils electrically connected in series and diametrically disposed opposite one another about the periphery of the chamber means;
current reversing means for reversing the direction of current through the coil set; and
current sequencing means for directing the flow of current through each coil set in a repetitive sequence, the current sequencing means having the characteristics of
(a) directing the current to flow through the first coil set to induce the DC magnetic flux field thereabout,
(b) removing the current from the first coil set and directing the current to a second coil set,
(c) repeating steps a and b until the plurality of coil sets has received current,
(d) reversing the direction of current flow to be opposite that of steps a-c via the current reversing means, and
(e) applying the reversed current in the same manner as in steps a and b so that a unidirectional rotating DC magnetic flux field is established within the chamber means, the velocity thereof being proportional to the rate of sequencing the current therethrough, the rotating DC magnetic field interacting with the arc current to rotate the arc root about the closed path in the chamber means, with the speed of arc rotation being proportional to the speed of the rotating DC magnetic flux field.

14. The furnace as described in claim 1, further comprising
feed means disposed with the chamber means and in communication with the interior thereof for the feeding of material to be heated into the chamber means.

15. The furnace as described in claim 1, further comprising
melt collection means disposed with the chamber means and in communication with the interior thereof for the removal of the melt.

16. An electric arc furnace, comprising:
chamber means for containing melt therein;
a water-cooled nonconsumable arcing electrode mounted through the top of the chamber means with the longitudinal axis thereof being positioned in a line substantially parallel to the vertical center line of the chamber means;
an arc attachment surface located in the chamber along a plane substantially perpendicular to the vertical center line of the chamber means and being axially spaced from the arcing electrode;
DC power means electrically connected to the arcing electrode and the arc attachment surface such that the arcing electrode has a potential and the arc attachment surface has a potential opposite that of the arcing electrode;
arc starting means for initiating an electric arc between the tip of the arcing electrode and the arc attachment surface;
field coil means mounted proximate the bottom of the chamber means, and electrically connected to the DC power means such that current flowing through the field coil means induces a DC magnetic flux field which is substantially transverse to the arc current at the arc root thereof proximate the arc attachment surface, resulting in a force that causes the arc root to be continually rotated about the arc attachment surface in a closed path thereon, the direction of current flow in the field coil means and in the electric arc with respect to one another being maintained so that the arc rotates in the same direction;
field coil positioning means to change the axial and/or radial position, of the field coil means with respect to the bottom of the chamber means thereby varying the arc path in the chamber due to the shifting of the induced magnetic flux field;
material feed means for feeding material into the chamber where it may come in contact with the arc for melting;
melt collection means for removing the melt from the chamber; and an electrical insulating member mounted on the bottom of the chamber in a line substantially parallel to the vertical center line of the chamber and extending in a generally upward direction therefrom a distance higher than the plane formed by the arc attachment surface or that formed by the melt, whichever is greater, the minimum radial dimension of the electrical insulating means corresponding to a distance from the vertical center line to a point on the plane formed by the arc attachment surface where the force created by the interaction of the induced DC magnetic field flux and the current flowing at the arc root is sufficient to maintain the continual rotation of the arc root about the closed path and results in the angular deflection of the arc from the vertical center line of the chamber means.

17. The apparatus as described in claim 16 further comprising electrically connecting the arc attachment surface and the arc electrode as the anode and cathode, respectively, and the arc attachment surface being the melt.

18. The apparatus as described in claim 16 wherein:
the bottom has a passageway therethrough located about the center line of the chamber means; and
the electrical insulating member has an exterior insulating portion in contact with the melt and an interior core having high magnetic permeability, the axial dimension of the core being greater than that of the insulating member and extending through the bottom passageway to the exterior of the chamber means whereby the insulating member prevents arc fixation and the core enhances the strength of the induced DC magnetic flux field interacting with arcing current to increase the force available to rotate the arc root in a closed path about the arc attachment surface.

19. The apparatus as described in claim 16 further comprising the arc attachment surface being an annular ring, the ring having a diameter less than that of interior opening of the chamber means so that the path of the electric arc substantially follow the ring.

20. The apparatus as described in claim 16 wherein the ring is formed of graphite.

21. The apparatus as described in claim 19 further comprising the ring being formed of an electrically conductive nonmagnetic material and having a passageway therein which extends about the length thereof, the passageway being used to conduct cooling water through the ring to prevent the overheating of the ring.

22. The arc furnace described in claim 16 wherein the field coil means further comprises:
a plurality of coil sets, each set having at least two coils electrically connected in series and diameterically disposed opposite one another about the periphery of the chamber means;
current reversing means for reversing the direction of current through the coil set; and
current sequencing means for directing the flow of current through each coil set in a repetitive sequence, the current sequencing means having the characteristics of
(a) directing the current to flow through the first coil set to induce the DC magnetic flux field thereabout,
(b) removing the current from the first coil set and directing the current to a second coil set,
(c) repeating steps a and b until the plurality of coil sets has received current,
(d) reversing the direction of current flow to be opposite that of steps a–c via the current reversing means, and
(e) applying the reversed current in the same manner as in steps a and b so that a unidirectional rotating DC magnetic flux field is established within the chamber means, the velocity thereof being proportional to the rate of sequencing the current therethrough, the rotating DC magnetic field interacting with the arc current to rotate the arc root about the closed path in the chamber means, with the speed of arc rotation being proportional to the speed of the rotating DC magnetic flux field.

23. The furnace as described in claim 16, further comprising
feed means disposed with the chamber means and in communication with the interior thereof for the feeding of material to be heated into the chamber means.

24. The furnace as described in claim 16, further comprising
melt collection means disposed with the chamber means and in communication with the interior thereof for the removal of the melt.

25. An electric arc furnace, comprising:
chamber means for containing melt therein;
an arcing electrode disposed on the top of chamber means and in communication with the interior portion thereof, the longitudinal axis of the arcing electrode being positioned in a line substantially parallel to the vertical center line of the chamber means;
an arc attachment surface proximate the bottom of the interior of the chamber means, the arc attachment surface being formed of the melt;
connector means disposed with the chamber means and in communication with the interior portion thereof, the connector means being in electrical connection with the melt and being radially offset from the vertical center line of the chamber means;
DC power supply means electrically connected to the arcing electrode and the connector means creating a potential between the arcing electrode and the arc attachment surface and providing current for flowing through an electric arc formed therebetween; the current further flowing through the melt to the connector means, the current flow in the melt inducing a DC magnetic flux field which interacts with the current flowing in the electric arc at the arc root thereof causing the rotation of the electric arc root about a closed path on the arc attachment surface; and
an electrical insulating member having a columnar portion and a radially extending arm and being disposed on the bottom of the chamber means, the height of the insulating member being higher than the arc attachment surface, the columnar portion being positioned along a line substantially parallel to the vertical center line of the chamber means with the minimum radial dimension thereof corresponding to a distance from the vertical center line to a point on the arc attachment surface where the force created by the interaction of the DC magnetic flux field induced by the flow of current through the material and the current in electric arc at the arc root is sufficient to maintain the continual rotation of the arc root about the closed path on the arc attachment surface, the arm extending between the columnar portion and an interior wall of the chamber means, the thickness of the arm being such that the flow of current cannot occur therethrough while allowing the electric arc to cross over or jump the arm without being extinguished, the arm being proximate the connector means thereby maintaining current flowing through the melt in only one direction.

26. The furnace as described in claim 25, further comprising feed means disposed with the chamber means and in communication with the interior thereof for the feeding of material to be heated into the chamber means.

27. The furnace as described in claim 25, further comprising melt collection means disposed with the chamber means and in communication with the interior thereof for the removal of the melt.

28. An electric arc furnace, comprising:

chamber means for containing melt therein;

an arcing electrode disposed on the top of chamber means and in communication with the interior portion thereof, the longitudinal axis of the arcing electrode being positioned in a line substantially parallel to the vertical center line of the chamber means;

an electrical insulator;

a split-ring electrode located within the chamber means having a gap between the ends thereof, the ends being adapted to receive the electrical insulator, the split-ring electrode being positioned proximate the surface of the melt in a plane substantially perpendicular to the vertical center line and forming an arc attachment surface;

connector means disposed with the chamber means and in communication with the interior portion thereof, the connector means being in electrical connection with the split-ring electrode proximate the electric insulator and being radially offset from the vertical center line of the chamber means; and DC power supply means electrically connected to the arc electrode and the connector means creating a potential between the arcing electrode and the split-ring electrode and providing current for flowing through an electric arc formed therebetween; the current further flowing through the split-ring electrode to the connector means, the current flow in the split-ring electrode inducing a DC magnetic flux field which interacts with the current flowing in the electric arc at the arc root thereof causing the rotation of the electric arc root about the surface of the split-ring electrode with the electric insulator being dimensioned such that the flow of current cannot occur therethrough while allowing the electric arc to jump or cross thereover without being extinguished, the electric insulator being proximate the connector means thereby maintaining current flowing through the melt in only one direction.

29. The furnace as described in claim 28, further comprising feed means disposed with the chamber means and in communication with the interior thereof for the feeding of material to be heated into the chamber means.

30. The furnace as described in claim 28, further comprising melt collection means disposed with the chamber means and in communication with the interior thereof for the removal of the melt.

31. An electric arc furnace, comprising:

chamber means for containing melt therein;

an arcing electrode disposed with the chamber means and in communication with the interior portion thereof;

an arc attachment surface in the interior portion of the chamber means, the arc attachment surface and the arcing electrode positioned such that an electric arc can be started and is maintained therebetween;

DC power means which in combination with the arcing electrode and arc attachment surface creates an electric potential therebetween and provides current for flowing through the electric arc;

a plurality of field coil sets, each set having at least two coils electrically connected in series and diametrically disposed opposite one another about the periphery of the chamber means;

current reversing means for reversing the direction of current through the coil set; and current sequencing means for directing the flow of current through each coil set in a repetitive sequence, the current sequencing means having the characteristics of (a) directing the current to flow through the first coil set to induce the DC magnetic flux field thereabout, (b) removing the current from the first coil set and directing the current to a second coil set, (c) repeating steps a and b until the plurality of coil sets has received current, (d) reversing the direction of current flow to be opposite that of steps a–c via the current reversing means, and (e) applying the reversed current in the same manner as in steps a and b so that a unidirectional rotating DC magnetic flux field is established within the chamber means, the velocity thereof being proportional to the rate of sequencing the current therethrough, the rotating DC magnetic field interacting with the arc current to rotate the arc root about the closed path in the chamber means, with the speed of arc rotation being proportional to the speed of the rotating DC magnetic flux field.

* * * * *